United States Patent

[11] 3,528,381

| [72] | Inventor | Wyly Kenneth Crowder<br>3255 Wyndcroft Drive, Pontiac, Michigan 48054 |
|---|---|---|
| [21] | Appl. No. | 762,687 |
| [22] | Filed | Sept. 26, 1968 |
| [45] | Patented | Sept. 15, 1970 |

[54] AQUATIC VEHICLES
7 Claims, 6 Drawing Figs.
[52] U.S. Cl............................................................. 114/67
[51] Int. Cl.............................................................. B63b 1/34
[50] Field of Search.............................................. 114/67; 115/67

[56] References Cited
UNITED STATES PATENTS
3,334,609  8/1967  Cockerell...................... 115/67
FOREIGN PATENTS
1,095,775  12/1967  Great Britain............. 114/67

*Primary Examiner*—Andrew H. Farrell
*Attorney*—James T. Barr

ABSTRACT: An aquatic vehicle involving a new principle of water propulsion, employing a paddle wheel assembly driven by a pressure supplied by pneumatic or hydraulic means to effect propelling action. This action is achieved by containing the air positively beneath the vehicle, during the driving action at a substantially reduced power expenditure.

Patented Sept. 15, 1970
3,528,381
Sheet 1 of 4
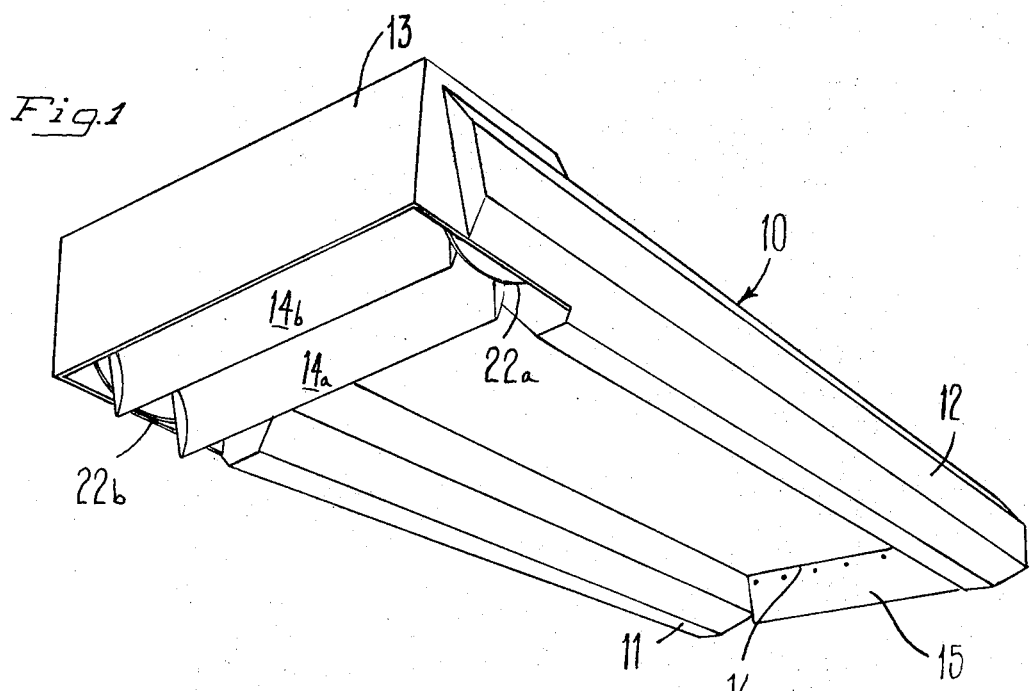
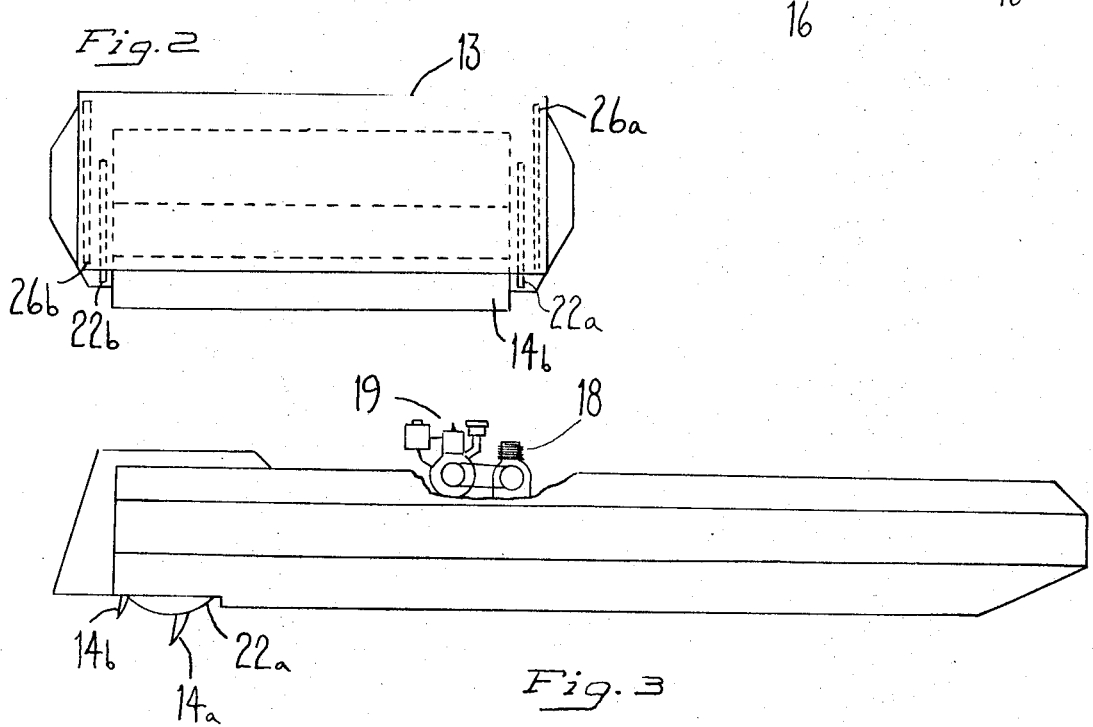
INVENTOR.
WYLY KENNETH CROWDER
BY
James T. Barr, Atty.

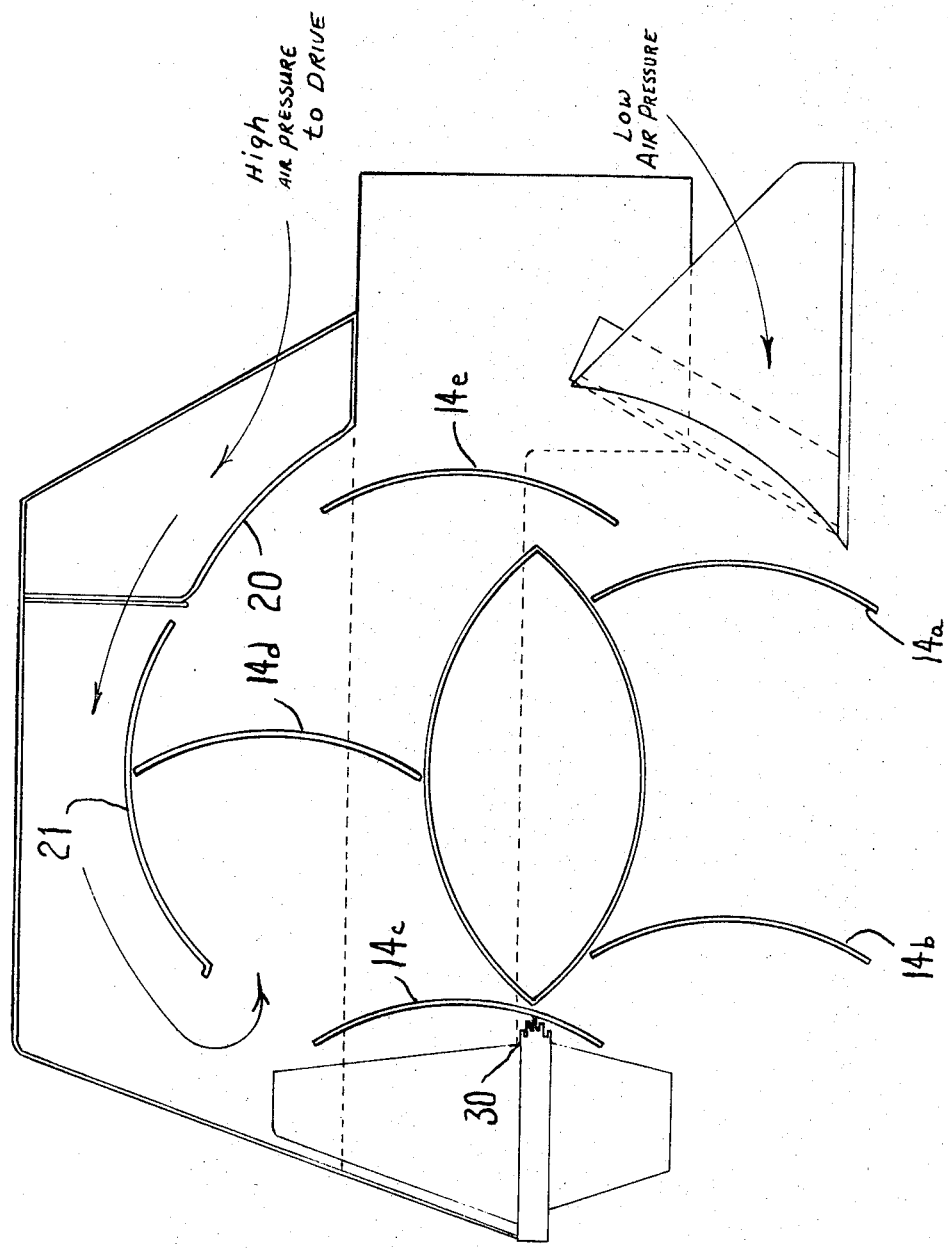

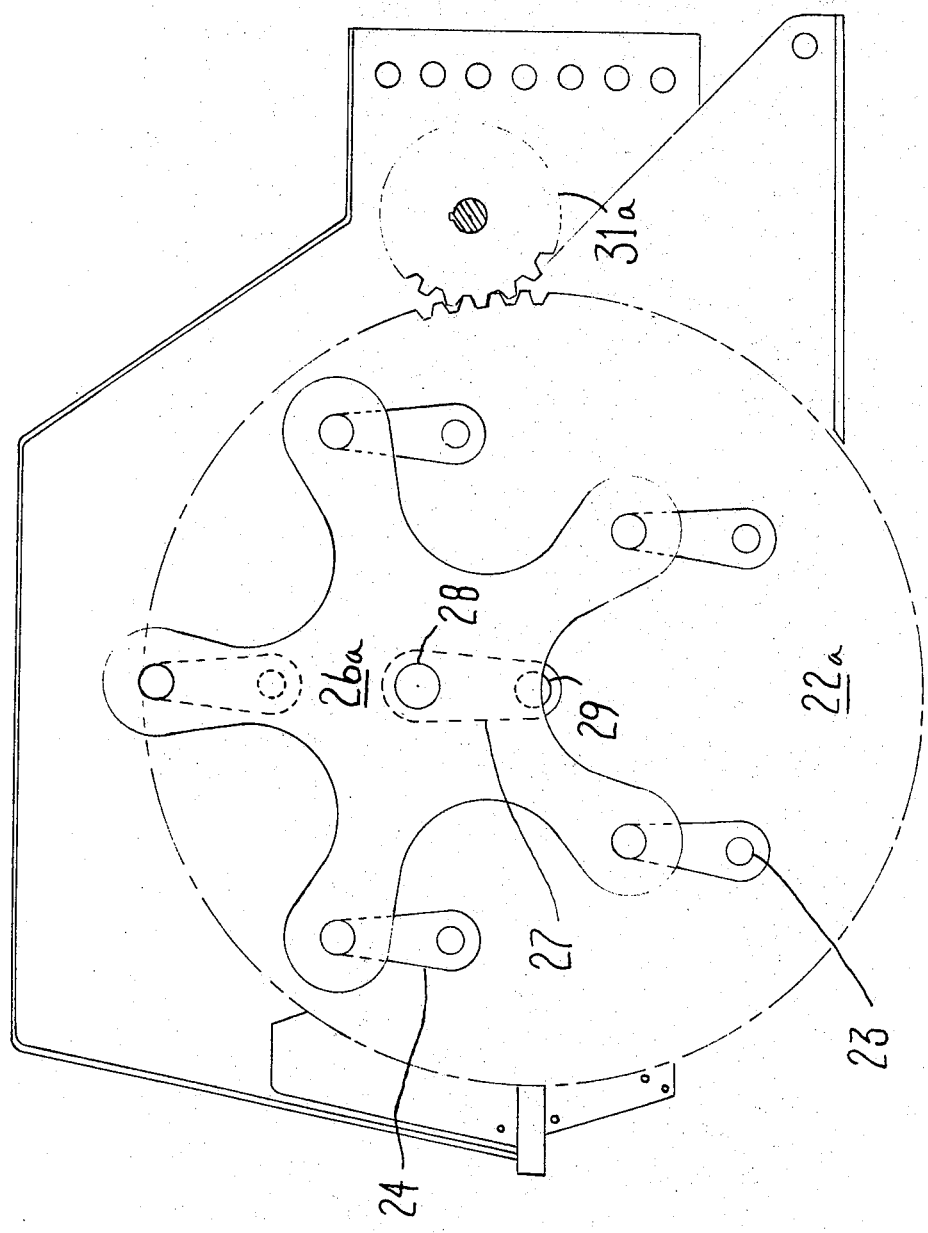

Patented Sept. 15, 1970

INVENTOR.
WYLY KENNETH CROWDER
BY
James T. Back, Atty.

3,528,381

AQUATIC VEHICLES

SUMMARY

This invention relates to a highly efficient marine vehicle drive.

The present invention seeks to provide an economical and efficient means of propelling a vehicle over water. Up to the present time, other systems of propulsion for boats and other aquatic vehicles; hydrofoils, amphibious crafts, have tried to achieve a maximum of propulsive efficiency by using air pressure to lift the craft and thereby reducing friction. In addition, other aquatic vehicles have attempted to provide means of propulsion based upon various configuration of boats, motors (both inboard and outboard) to achieve some degree of efficiency over water and/or swamp areas having a marginal degree of water surface areas. It will be realized that the prior art has attempted to surmount these problems, but have failed to achieve their purpose due to the fact that vehicles used over water are merely haphazard attempts to modify land vehicles for use as aquatic vehicles. In this respect, they have failed because the original "horse and buggy" concept has been applied. For example, gasoline engines were applied to the stern of boats initially with a disregard for hydro-dynamic principles by attempting to use propulsion devices from land vehicles to effect movement of the aquatic vehicles. In the prior art there has appeared to be a disregard or a lack of recognition of hydro-dynamic principles with respect to both the design of boats and their motive power application because of the tendency to apply the theories of land vehicles to aquatic vehicles. As a result, the trend has been to combine the principle of land propulsion vehicles to boats with the inevitable result of low efficiency, and sacrifice of power by whichever means of propulsion is used. But all these related systems have not utilized air pressure to its full potential, most have relied upon some other means of propulsion once the vehicle has been lifted, or if air pressure was used solely, it was mostly wasted as is the case with hydrofoils.

The present invention achieves efficiency by containing the air positively beneath and encompassing the underpart of the vehicles; this is in contrast to the aforementioned systems where the air is allowed to spill out continuously around the periphery and in many respects it is not utilized, but rather acts as a drag on the vehicle.

Containment of the air is achieved by having keels on each side of the boat which hold the air laterally while a flexible shield or vane can ride the water surface across the bow to seal the bow portion of the vehicle. Similarly means are provided to effect sealing across the stern as well as driving the vehicle which will be further explained hereinafter. In essence, a paddle wheel assembly sealed at the stern is driven forward by mounting air pressure supplied by a small air pump or similar means. This pump may be driven, for example, by an ordinary gasoline engine of 5 to 10 hp. It has been estimated that the present invention with a 10 hp. gasoline engine can equal the performance of a 50 hp. outboard engine using equal type vehicles.

It has been offered as an opposing argument concerning paddle wheel mechanisms that paddle wheels are not suited to high speed operation because between the moment of entering the water and the moment of leaving, the angle of attack of each blade relative to the water is constantly changing. Accordingly, each blade is deployed at the most efficient angle of attack for a very small portion of its path through the water; that portion being when the blade is in a vertical position, therefore the overall efficiency of the paddle wheel is low. Furthermore, the close proximity of the blades to each other causes each blade to move in the wake of the preceding blade and thus perform relatively inefficiently. It has been further suggested that there is a considerable energy loss at the entry of each blade into the water due to splashing and a further energy loss occurs on leaving the water because the blades tend to lift water above the surface.

The aforementioned argument is based on the old paddle wheel system where blades are securely attached to a wheel or cylinder such that the angle of attack relative to the water constantly changes as the wheel or cylinder turns; the angle being horizontal at first contact with the water, then rotating to a vertical position at which time relative efficiency is achieved, and then back to a horizontal position losing most of what efficiency the system had gained. The present invention uses a unique principle whereby the angle of attack remains constant; that is, the angle of each blade remains vertical relative to the water level. Each of five blades being vertical at all times means there is no splash or subsequent energy loss caused by the broad side of the blade hitting the water surface, and there is no further loss caused by lifting water above the water level as the blade leaves the water. Also, there is no wake to impede movement caused by preceding blades.

Vertical positioning of each blade means the blades cut the water like a knife and its most efficient angle of attack is maintained from the moment of entering to the moment of leaving, the blades are working at all times in contact with water. It should also be noted that as the blade leaves the water an acceleration takes place thereby causing a continuous acceleration without any additional demand upon the original power source, that being the small gasoline engine.

This same reasoning can be applied when referring to a propeller system because basically a propeller is of the same design as a paddle wheel: a series of blades attached to a rotating shaft or cone-shaped cylinder whereby the angle of attack changes with each rotation. Propeller efficiency is also limited by the high slip speed between the water and the propeller which causes cavitation and limited further by drag occasioned by the structures supporting the propeller. Furthermore a propeller acts upon a homogeneous stream tube of water at some depth below the surface whereas the present invention acts upon the surface layer of the water.

DRAWING DESCRIPTION

These and other aspects of the present invention are best illustrated in the specification and the accompanying drawings, in which:

FIG. 1 represents a perspective view of the underside of the aquatic vehicle;

FIG. 2 is the rear view of the aquatic vehicle, shown in FIG. 1;

FIG. 3 is the side view of FIG. 1 and with details showing the assembly thereof;

FIG. 4 is a detailed view of the paddle wheel assembly, shown at the rear of FIG. 3;

FIG. 5 is a sectional view of FIG. 4, with the parallel driving mechanism illustrated with protective covering eliminated.

DETAILED DESCRIPTION

Figure 6:
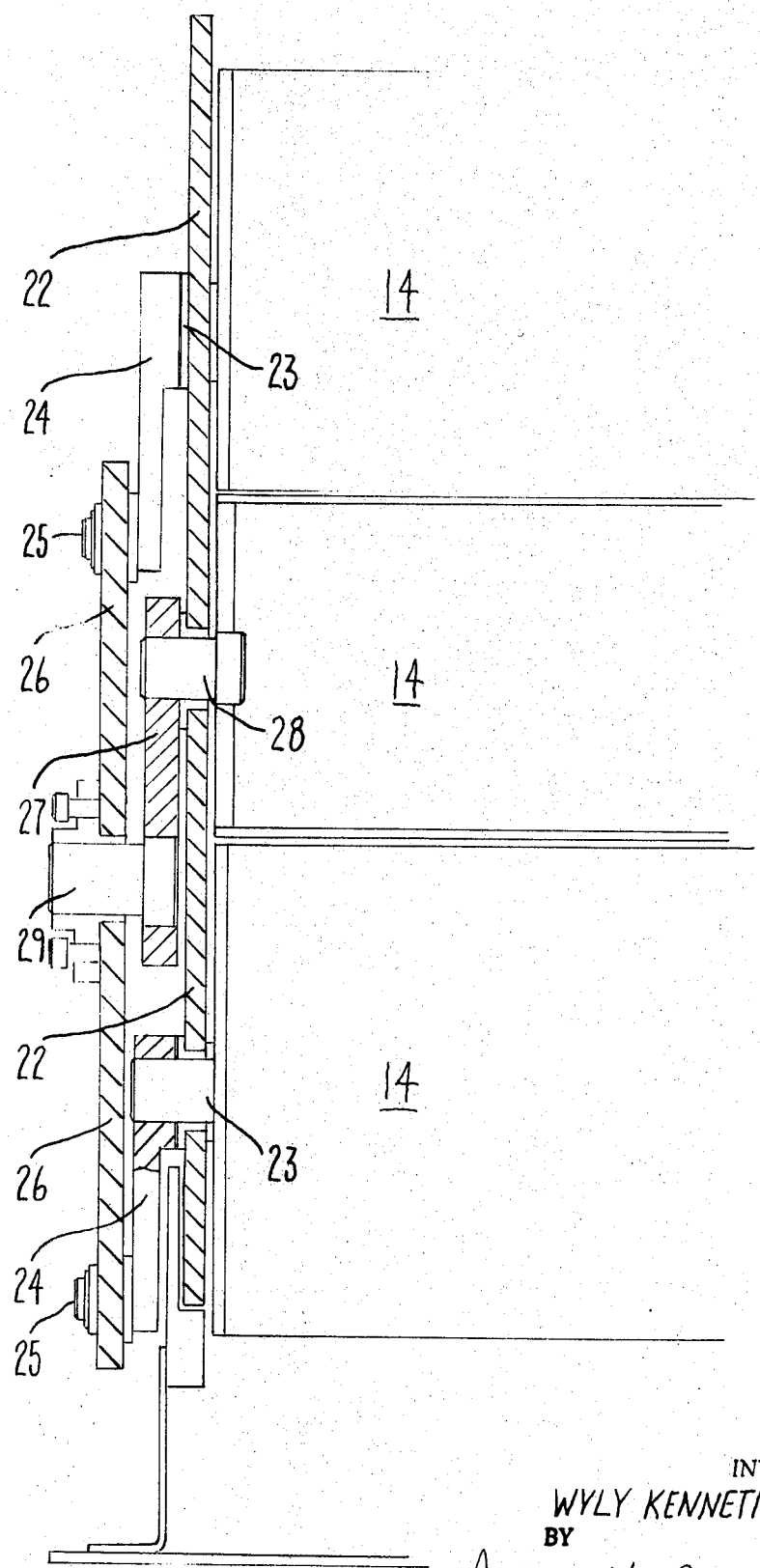
FIG. 6 is a view showing the driven means as shown in FIGS. 4 and 5.

Referring now to FIGS. 1, 2 and 3 there is shown the aquatic vehicle 10 having laterally spaced pontoons or hulls 11 and 12. At the rear of the vehicle is the propulsion means 13 with paddle assembly 14 enclosed therein. At the front of the vehicle, best shown in FIG. 1, is a flexible shield 15 that is hinged to the vehicle 10 by means of a hinge 16, or similar suitable means, on the bottom side of the portion between the lateral hulls 11 and 12. Shield 15, made of rubber, plastic, or other such flexible material, acts to seal in air pressure at the bow of the vehicle 10 by riding the surface of the water, whereby the forward movement of said vehicle aids in the sealing ability of shield 15. While a particular catamaran vehicle has been described, it should be understood that other types of vehicles may be propelled by the mechanism of the invention just described.

Referring to FIGS. 1 and 3, which diagrammatically illustrates the principle of operation of the invention, propulsion means 13 represents a novel propulsion assembly which is in the form of paddle wheel blades 14a through 14e which is acted upon by mounting air pressure confined beneath the vehicle. The term "blade" is used broadly to include any element extending from or between paddle wheels 22a and 22b, being more specifically described herein below.

Air pressure is supplied by a small air pump or similar means 18, which is driven by a small gasoline engine 19. As the pressure builds, and not having any means of escape, it acts upon the paddle assembly: first by forcing blade 14a to move clockwise thereby engaging a large mass of water, and second by traveling over the containing arc wall 20, through valve 21 and thereby acting on the front side of blade 14d to drive it clockwise.

In FIG. 5 there is shown one 22a of a pair of rotatable members or wheels 22a and 22b (shown in FIG. 2).

A pair of cooperating rotatable crank members 26a and 26b (shown in FIG. 2) work in conjunction with wheels 22a and 22b, respectively. Wheels 22a and 22b achieve parallel movement by means of gears 31a (shown in FIG. 5) and 31b (not shown) which rotate on a shaft to provide simultaneity of said disc members. Disposed in the space between the wheel members 22a and 22b are plural paddle blade means 14a through 14e mounted so that on rotation of the members the blades move in and out of the water while always maintaining a vertical position.

Referring now to FIG. 6 the blades 14a through 14e have shafts 23a through 23e extending from either end. These shafts extend through primary wheels 22a and 22b and are securely fastened to the bottom part of arm 24 which constitutes an assembly of arms 24a through 24e. These arms 24a through 24e, have fastened securely at their other end another shaft 25a through 25e which protrude in the opposite direction as shafts 23a through 23e. As before mentioned, shaft 23 is extended through primary wheel 22; shaft 25 then extends through secondary wheel 26. The primary wheel 22a and secondary wheel 26a are connected at their centers by a similar arm 27 which in turn is fastened by similar shafts 28 and 29 respectively.

In reference to FIG. 4 where the parallel movement of the blades 14a through 14e is illustrated in detail, the blade 14a dips into the water at approximately zero surface speed and then accelerates continuously towards aft on each stroke. The motion and curvature of the blades 14a through 14e achieve a continuous acceleration while at the same time making air motivation a simple implementation. The broad side of the blade 14a is acted on by air pressure to rotate it forward and as the blade 14a arcs upward, it slides through a narrow passage or seal 30 with very little area exposed for rearward torque or rotation. Simple geometry for a minimum narrow seal 30 is achieved by providing parallelity between all blades 14a through 14e and then curving said blades to the same radius or arc as the radius of their action path, only in the opposite direction. Each of the five blades 14a through 14e has an arc length of one-fifth of the circumference of the action path of rotation and this provides a continuous blade movement through seal 30 so there is never a time when air can spill out uninhibited.

Speed control and reverse become possible by containing the blades as they move forward on the top side of the paddle wheel assembly. If air is restricted in its flow around the containing arc wall 20 to the back of the upper blade 14d, then consequent drop in pressure slows down or reduces the forward torque of the paddle wheel assembly. This is achieved by closing valve 21. Furthermore, if the air is bled out of the chamber or passage to the back side of paddle blade 14d, reverse rotation is obtained.

It is to be understood that this invention contemplates further modifications which would be well understood by those skilled in the art, and it is intended to be limited only by the appended claims.

I claim:
1. In an aquatic vehicle, a hull containing a confined area therebeneath, power means on said vehicle, pressure means supplied by said power means, a plurality of blades, arranged on a rotatable member and mounted on said hull to maintain angular uniformity with respect to each other and the water, and conduit means to transmit said pressure means to said blades to rotate said blades for propulsion of said vehicle.

2. The aquatic vehicle of claim 1 wherein said confined area of said hull and said conduit means comprises a relatively closed pressure path for effective utilization of said pressure means for propulsion of said vehicle.

3. The aquatic vehicle of claim 1 wherein said conduit means includes sealing means for restricting pressure while permitting said blades to pass therethrough.

4. The aquatic vehicle of claim 1 wherein said hull contains flexible shielding means at one end thereof to maintain a confined pressure area beneath said hull.

5. An aquatic vehicle comprising, a hull, propulsion means on said vehicle, pressure means to drive said propulsion means, said propulsion means including planetary blades angularly maintained with respect to each other and the water.

6. The aquatic vehicle of claim 5 wherein said hull includes a confined area in proximity to the water.

7. The aquatic vehicle of claim 6 wherein said confined area includes flexible shielding means at one end thereof.